United States Patent [19]

Jones et al.

[11] Patent Number: 5,587,928
[45] Date of Patent: Dec. 24, 1996

[54] COMPUTER TELECONFERENCING METHOD AND APPARATUS

[75] Inventors: Oliver Jones, Andover; Mary Deshon, Winthrop; Staffan Ericsson, Brookline, all of Mass.; James Flach, Cave Creek, Ariz.

[73] Assignee: Vivo Software, Inc., Waltham, Mass.

[21] Appl. No.: 242,271

[22] Filed: May 13, 1994

[51] Int. Cl.$^6$ ...................................................... H04N 7/10
[52] U.S. Cl. ....................... 364/514 A; 348/15; 348/441; 348/552
[58] Field of Search ........................... 364/514 A, 514 C; 348/15, 441, 445, 552; 345/204; 395/162

[56] References Cited

U.S. PATENT DOCUMENTS

| | | | |
|---|---|---|---|
| 4,949,169 | 8/1990 | Lumelsky et al. | 358/86 |
| 5,062,136 | 10/1991 | Gaths et al. | 380/18 |
| 5,192,999 | 3/1993 | Graczyk et al. | 358/85 |
| 5,280,540 | 1/1994 | Addeo et al. | 379/54 |
| 5,283,638 | 2/1994 | Engberg et al. | 348/14 |
| 5,315,702 | 5/1994 | Kusakawa | 395/164 |
| 5,374,952 | 12/1994 | Flohr | 348/12 |
| 5,375,068 | 12/1994 | Palmer et al. | 364/514 |
| 5,426,731 | 6/1995 | Masukane et al. | 395/162 |
| 5,434,913 | 7/1995 | Tung et al. | 379/202 |
| 5,444,476 | 8/1995 | Conway | 348/15 |
| 5,446,491 | 8/1995 | Shibata et al. | 348/15 |
| 5,534,914 | 7/1996 | Flohr | 348/15 |

FOREIGN PATENT DOCUMENTS 2271253 4/1994 United Kingdom.

OTHER PUBLICATIONS

Milt Leonard, "Teleconferencing Invades the Desktop", Aug. 6, 1992, pp. 47–52, Electronic Design, vol. 40, No. 16.
Mon–Song Chen et al, "A Multimedia Desktop Collaboration System", Dec. 6–9, 1992, pp. 739– IEEE Global Telecommunications Conference, vol. 2.
Graham Mills et al., "PC–Based Visual Communications Services", Jan. 4, 1994, pp. 266–271 British Telecommunications Engineering, vol. 12.

Primary Examiner—James P. Trammell
Assistant Examiner—Patrick J. Assouad
Attorney, Agent, or Firm—Wolf, Greenfield & Sacks, P.C.

[57] ABSTRACT

A computer teleconferencing method and apparatus are provided which permits transmission of video image sources including both computer display images and other video images. The apparatus may include at a local teleconferencing site a personal computer having a video graphics adapter, a monitor and a digital telephone interface. The digital telephone interface is used to establish communications with a remote teleconferencing site. The apparatus may further include a video camera and a video capture system connected into the personal computer. The method may include steps of capturing snapshots of a computer display image, converting those snapshots to a digital television form, and compressing and transmitting the digital television signal to the remote teleconferencing site.

12 Claims, 9 Drawing Sheets

COMPUTER TELECONFERENCING METHOD AND APPARATUS

FIELD OF THE INVENTION

The present invention relates generally to the field of teleconferencing. More particularly, the invention relates to teleconferencing methods and apparatus wherein it is desired to communicate both video images and computer display images in one teleconference.

BACKGROUND

Audio teleconferencing is a widely accepted business tool, conducted using conventional telephone equipment. Multi-party telephone calls may be set up both by individual subscribers having the proper equipment and by the various local and long distance telephone companies. The equipment required is simply that necessary to form multi-way connections through the public switched telephone network (PSTN).

Video teleconferencing is a newer form of remote business communication tool, conducted through the PSTN using both conventional telephone equipment and specialized video communication equipment. Video teleconferencing may be conducted over conventional analog telephone lines or over newer digital or integrated services digital network (ISDN) telephone lines. Generally, the apparatus for performing video teleconferencing includes apparatus for compressing video image signals.

Video image signals representative of a live scene at a teleconferencing site usually take an analog form. That is, the continuous physical characteristics of the image, such as brightness and color, are represented by continuous electrical quantities, such as voltage, phase and frequency. However, video image signal compression is generally performed on digital video image signals, due to the ease with which digital signals may be processed by computer systems. Thus, before performing video image signal compression, the analog video image signals are first converted to digital form, wherein the continuous electrical quantities are represented by digital image signals comprising sequences of discrete numbers. Each discrete number is a sample, representative of a value of the corresponding analog signal at a specific point in time. Each specific point in time in turn corresponds to a specific point within the image.

Although the analog video image signal and the digital video image signal are substantially equivalent representations of the physical characteristics of the image, digital video image signals are particularly suitable for processing using computers, as noted above.

Computers can perform a wide variety of arithmetic processes and logical processes on digital signals. Results of operations performed by computers are frequently displayed on a computer display monitor, which resembles a video display. However, it should be noted here that the image signals used to define an image for a television monitor and the signals used to define an image for a computer display monitor differ from each other to a significant extent. A computer display image signal cannot be used directly to display an image on a television monitor; and, a conventional video image signal cannot be used directly to display an image on a conventional computer display monitor. A conversion from one form to the other is required to display an image on a display of one type using a signal of the other type. This conversion is required because, among other differences, the two signals often use different color representations, different vertical resolutions (lines per image), and different horizontal resolutions (picture elements per line).

Thus, conventionally a personal computer (PC) operator wishing to send a computer display image to another site required an arrangement similar to that shown in the block diagram of FIG. 1. In this arrangement, a computer display image in the form of (for example) a video graphics adapter (VGA) signal 101 is output by a VGA card 103 in the PC 105, and is transmitted to a separate device known as a scan converter 107. The scan converter 107, in turn, outputs an analog television signal 109 (e.g., in NTSC or PAL format, composite or Y/C, etc.), which can be passed to a video compression device 111 or possibly to a video recorder (not shown). The scan converter 107 also outputs another analog VGA signal 113, which is used to drive a computer display monitor 115. Several scan converters are presently on the market, including, for example, the Mediator™ product from Video Logic, a UK company.

The above discussion is of general applicability to both monochrome and color images. Modern computer display images are frequently rendered in color, which requires additional apparatus, as now described.

One common way to represent a color computer display image is as three monochromatic image signals, representative of the intensities at each point in the image of the colors red, green and blue. The VGA signal referred to above represents each point in an image as a triad of sample values corresponding to values of the red, green and blue signals at each point in the image. In order to convert the three color digital signals processed by the PC to analog form for input to a computer display monitor, a VGA card in a PC contains three digital-to-analog converters, one each for red, green, and blue signals. The VGA card thus outputs three analog signals, one each for the red, green and blue intensities comprising the image.

A scan converter may contain three analog-to-digital (A/D) converters used to convert the VGA signals to digital form for convenient processing, memory for storing image signals, circuitry for converting the red/green/blue (RGB) color representation of the VGA signal to an interlaced luma/chroma (Y/C) color representation commonly used in television signals, circuitry for converting signals from VGA image resolution to television image resolution, and one or more digital-to-analog (D/A) converters used to convert the output signal from digital form to analog television form. The video compression unit may contain one or more A/D converters necessary to convert and de-interlace the television signal for processing, memory to store the digital television signal during processing, and circuitry to compress and transmit the image. Thus, using this arrangement, a PC display is twice converted to and from analog form.

SUMMARY OF THE INVENTION

It is a general aim of the present invention to simplify the apparatus necessary to teleconference using computer display images mixed with conventional video images, such as television images. This and other aims and goals of the present invention will be apparent to those skilled in this art.

It should be noted here that video conferencing is not limited to a particular operational configuration. Video conferencing systems, as used herein, include, but are not limited to, one-way and two-way communication systems, multicast one-way systems, surveillance systems, and systems with or without a voice channel. The following aspects of the present invention thus have general applicability. Moreover, video conferencing as contemplated by the present invention includes, but is not limited to, communications conducted through the PSTN, switched data networks, packet networks and other networks suitable for communicating compressed video information. Furthermore, some elements of the following aspects of the present invention are described as means for performing various functions. These means may be embodied as specialized hardware suitable for performing the specified functions, may be embodied as software executing on general purpose hardware, or may be a blend of the above found to be suitable for the particular application.

According to one aspect of the present invention, there is provided a system for video conferencing, comprising: a computer including a graphics subsystem in which a computer display image is represented by a digital computer display signal having a format different from a digital television signal format; means for obtaining from the graphics subsystem a sequence of frames of the digital computer display signal, the frames representative of at least a portion of the computer display image; means for converting the sequence of frames of the digital computer display signal into a sequence of frames of a digital television signal; and means for compressing the digital television signal for transmission to a system for receiving compressed digital television signals. Many variations on this aspect of the present invention are possible.

Variations on this aspect of the invention include the provision of multiple sources to the means for compressing. For example, the system may include a television camera having a television signal output; and a video capture subsystem in the computer, connected to receive the television signal output from the television camera so as to produce another digital television signal input to the means for compressing. Furthermore, in a system having such multiple video sources, the means for compressing may include means for switching between compressing the digital television signal and compressing the other digital television signal. In the system according to this aspect of the present invention, the means for converting may further comprise a cursor insertion subsystem, connected to receive the television signal output from the means for converting so as to produce the digital television signal. Also, in the system according to this aspect of the present invention, the means for obtaining may further comprise means for selecting a portion of the computer display image represented by the sequence of frames. The foregoing variations may be combined to form numerous other variations contemplated as within this aspect of the present invention. According to another aspect of the present invention, there is provided a system for video conferencing, comprising: means for compressing digital television signals, having a first input and a second input; a first source of digital television signals, including a television camera, the first source of digital television signals connected to the first input of the means for compressing digital television signals; and a second source of digital television signals, including a computer display signal generator and a means for converting a computer display signal generated thereby into a digital television signal, the second source of digital television signals connected to the second input of the means for compressing digital television signals. Variations similar to those described above in connection with the first aspect of the present invention are possible here, as well.

According to yet another aspect of the present invention, there is provided a system for video conferencing, comprising: a computer system including a source of digital computer display image signals and a source of cursor location information; a snapshot module operative within the computer system with an input for receiving the digital computer display image signals, and which produces as an output selected digital computer display image signals, for example those computer display image signals representative of a still-image snapshot of the computer display; a conversion module operative within the computer system with an input for receiving the selected digital computer display image signals, and which produces as an output conventional digital television image signals corresponding to the received selected digital computer display image signals; and a cursor insertion module which inserts a cursor icon at a location in the conventional digital television image signals indicated by the cursor location information. The elements described are also subject to some variation, as described above.

According to yet another aspect of the present invention, a system for video conferencing, may comprise: means for compressing digital television signals, having a first input and a second input; a first source of digital television signals, including a television camera, the first source of digital television signals connected to the first input of the means for compressing digital television signals; and a second source of digital television signals, including a computer display signal generator and a means for converting a generated computer display signal into a digital television signal, the second source of digital television signals connected to the second input of the means for compressing digital television signals. As above, this aspect of the present invention is subject to similar variations of the elements.

The present invention also includes aspects pertaining to a method of video conferencing between a local location and a remote location using a computer. The method according to one aspect of the invention comprises the steps of: obtaining in the computer a digital computer display image signal; selecting for transmission a portion of the digital computer display image signal representative of a portion of a display image; scaling the selected portion of the digital computer display image signal, forming a scaled image signal; converting the scaled image signal into a digital television signal; inserting a cursor icon at a selected location within the digital television signal; and compressing and transmitting the digital television signal to the remote location. This aspect of the invention may be varied by further providing that the step of scaling further comprises the step of filtering using a decimation/interpolation filter.

BRIEF DESCRIPTION OF THE DRAWING

Embodiments of the present invention will now be discussed in connection with the figures. Like reference numerals indicate like elements in the figures, in which.

DETAILED DESCRIPTION

The present invention will be better understood in view of the following description, read in connection with the figures.

Figure 2:
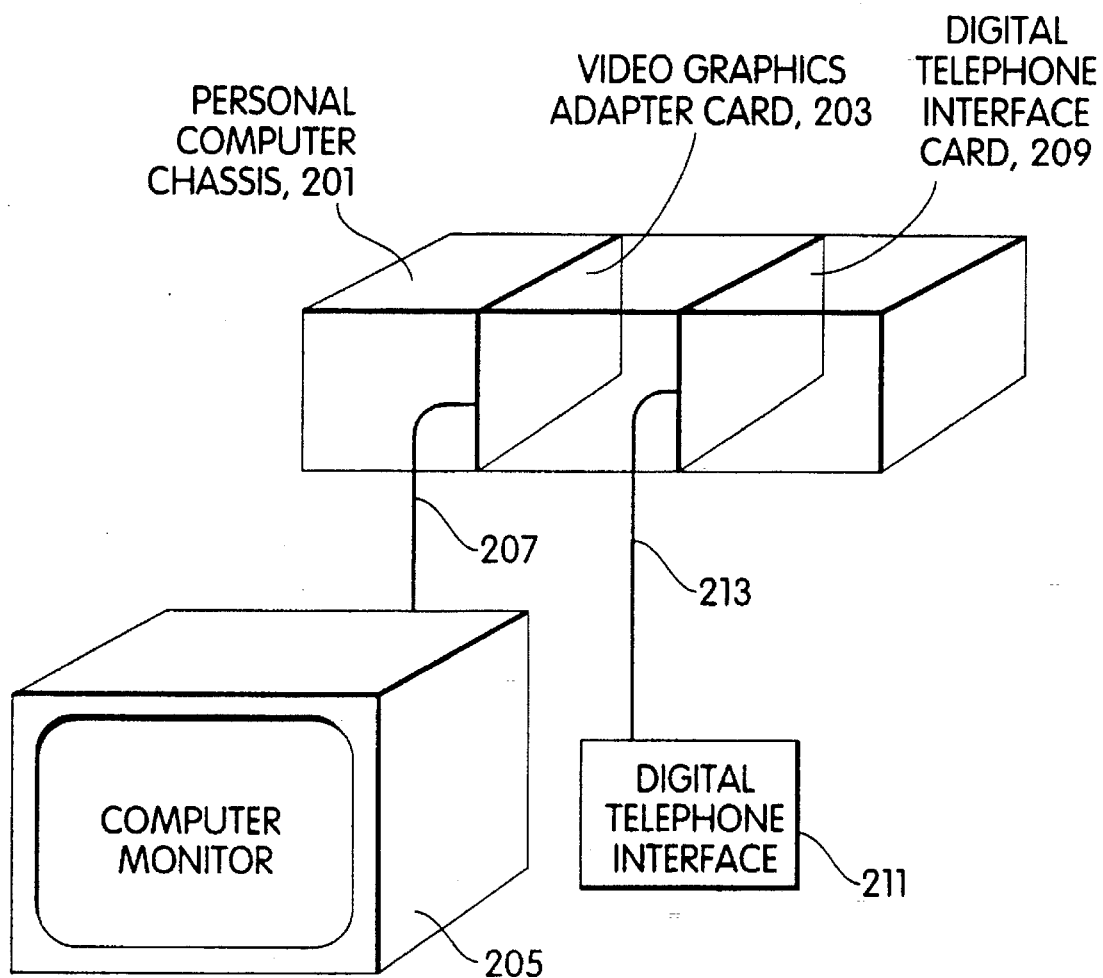
FIG. 2 is a block diagram of a teleconferencing system according to one aspect of the present invention.

As shown in FIG. 2, the present invention may be practiced using a minimum of special hardware. The illustrated embodiment of the invention is based upon a conventional PC 201, including in addition to a CPU (not shown) and memory (not shown), a VGA circuit card 203 connected to a computer display monitor 205 through a VGA cable 207, and a digital telephone interface circuit card 209 connected to a digital telephone interface 211 through a digital telephone cable 213. Of course any circuit or computer-related device which is indicated in this description to reside on a separate circuit card or in a separate box from the PC may also be integrated into the same circuit card or unit as the PC, itself.

One suitable configuration includes a PC having an Intel® Pentium™ processor running at 60 MHz; 16 Mbytes of random access memory (RAM); 0.25 Mbytes of fast secondary cache RAM; a VGA circuit card configured to represent each picture element (pixel) as 8 bits and including 1 Mbyte of display RAM and a 256-entry lookup table or a VGA circuit card configured to represent each pixel as at least 15 bits, 5 bits each for red, green and blue values, and including 2 Mbytes of display RAM; a video capture circuit card; and a digital telephone network card. An operating system such as Microsoft® MS-DOS™ together with an operating environment such as Microsoft® Windows™ are suitable for controlling operation of the system.

Figure 3:
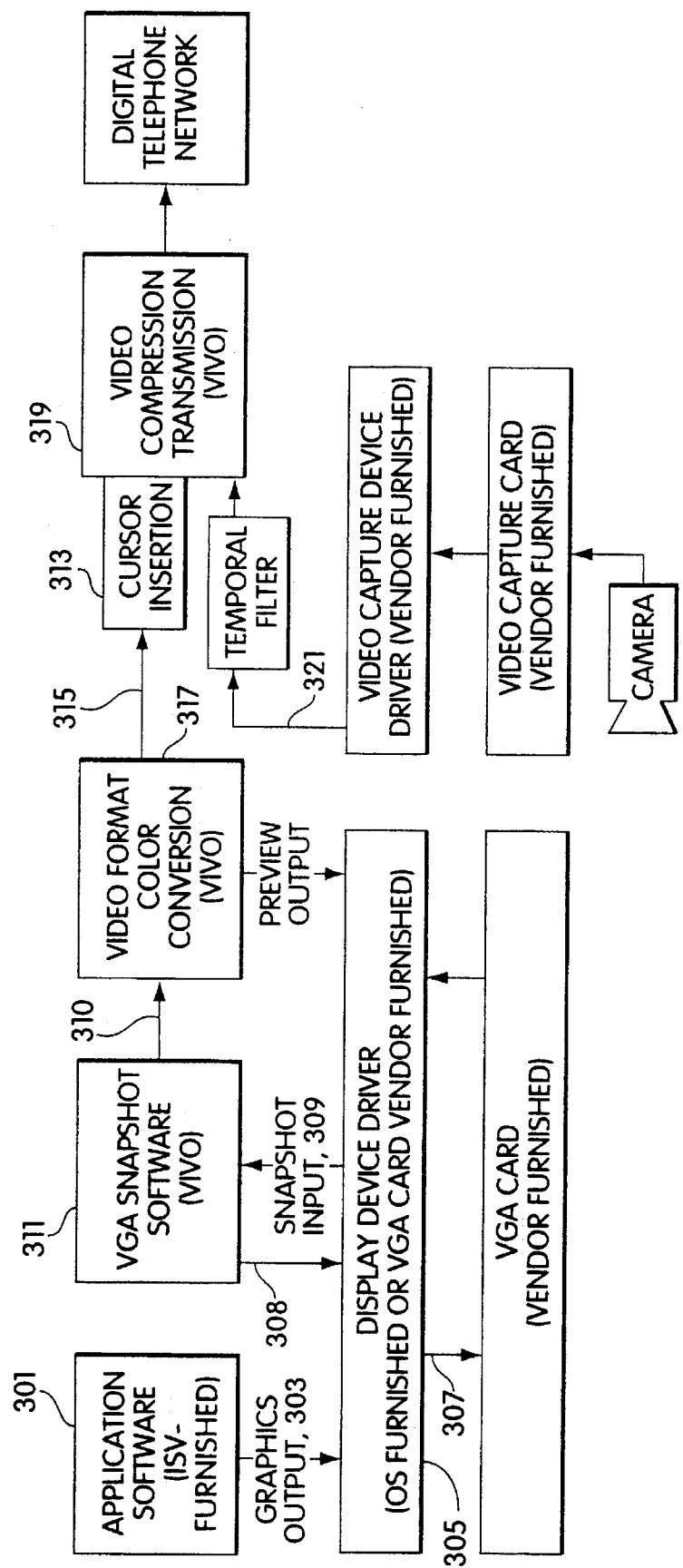
FIG. 3 is a signal flow diagram showing a process according to one aspect of the present invention.

The signal flow diagram of FIG. 3 shows the various processes comprising various aspects of this embodiment of the present invention. Not shown, but underlying much of the operation of the PC in response to various software programs is the operating system and operating environment, collectively referred to hereinafter as the operating system. The operating system provides such services to the operator as a user interface, connections to the PC hardware, whereby software may transmit signals to or receive signals from the hardware, and various other support functions. Relevant functions of the operating system will be discussed as they arise.

Processing begins with initiation by an operator of execution of an application software program 301 on the CPU of the PC. It is assumed that the application software program 301 produces some type of signal 303 for generating a visual output for presentation to the operator on the computer display monitor (FIG. 2, 205). It is further assumed that the operator desires to transmit some portion or all of the computer display image presented for viewing at a remote teleconferencing site.

Ultimately, application software programs executing on the CPU of the PC produce graphical output signal 303 which is received by a VGA display device driver 305, which in turn renders the output visible on a computer display monitor (FIG. 2, 205). Device drivers are software program modules generally supplied by the manufacturer of the device with which they are associated, which fit into and effectively become a part of the operating environment software, such as Microsoft® Windows™, and which permit application software programs to communicate signals to or from hardware devices, such as computer display monitors. Signals are received by the VGA device driver 305 in the form of a sequence of software function calls from the application software program to various device driver functions. In response, the device driver produces various output signals, which may be written to conventional PC memory or which may be written to the hardware devices controlled by the output signals. For example, the VGA device driver 305 illustrated produces output signals 307 which are written to a VGA circuit card, so as to control display of image signals on a computer display monitor (FIG. 2, 205) attached thereto. The VGA device driver 305 illustrated also produces upon command 308 a snapshot image signal 309 which is a single frame of the continuous computer display image signal 307 controlling the computer display monitor, much like a television freeze-frame image signal. An appropriately timed sequence of commands 308 produces a sequence of snapshots 309, in which case the continuous computer display image signal is effectively "captured" 310 and stored or for further processing in the PC. Capture of such a timed sequence of snapshots 309 is controlled by the snapshot module 311 of this embodiment.

The snapshot module 311 permits the PC operator to select the time sequence 310 of the computer display image desired to be captured, as well as the physical boundaries of the portion of the computer display image desired to be captured. Identifying a desired portion of the computer display image to capture is known in the art, as performed by Microsoft® Video For Windows™ for example. The identification may be performed using a pointing device such as a mouse, a trackball, or other suitable means for controlling the location of a cursor icon on a computer display monitor. For example, the operator may use the pointing device to select a particular window, or the operator may use the pointing device to sweep out a desired rectangle, indicating diagonally opposite corners thereof. Thus, a selection rectangle of a portion of the computer display image is produced. One point of note is that the cursor icon itself is not included in any snapshot, even when the cursor is within the selection rectangle, at the selected time, because the cursor icon is inserted into the computer display image signal at a later stage 313 of output processing. Selection and subsequent processing of the sequence of VGA image signals is now described in greater detail.

Figure 4A:
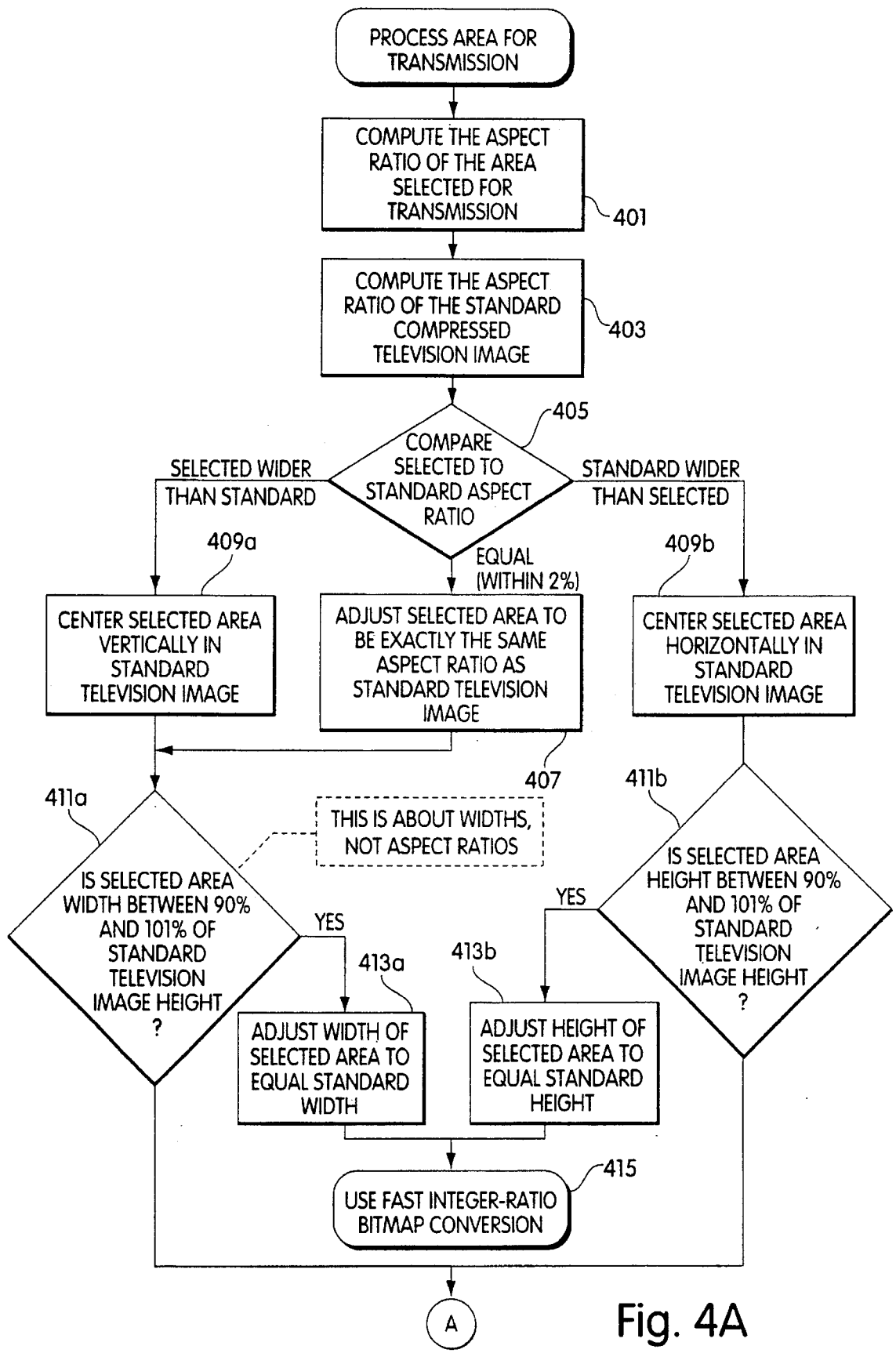
FIG. 4A is the first part and FIG. 4B is the second part of a flow chart showing a method of processing a portion of an image signal denoted by a selection rectangle according to one aspect of the present invention.
Figure 4B:
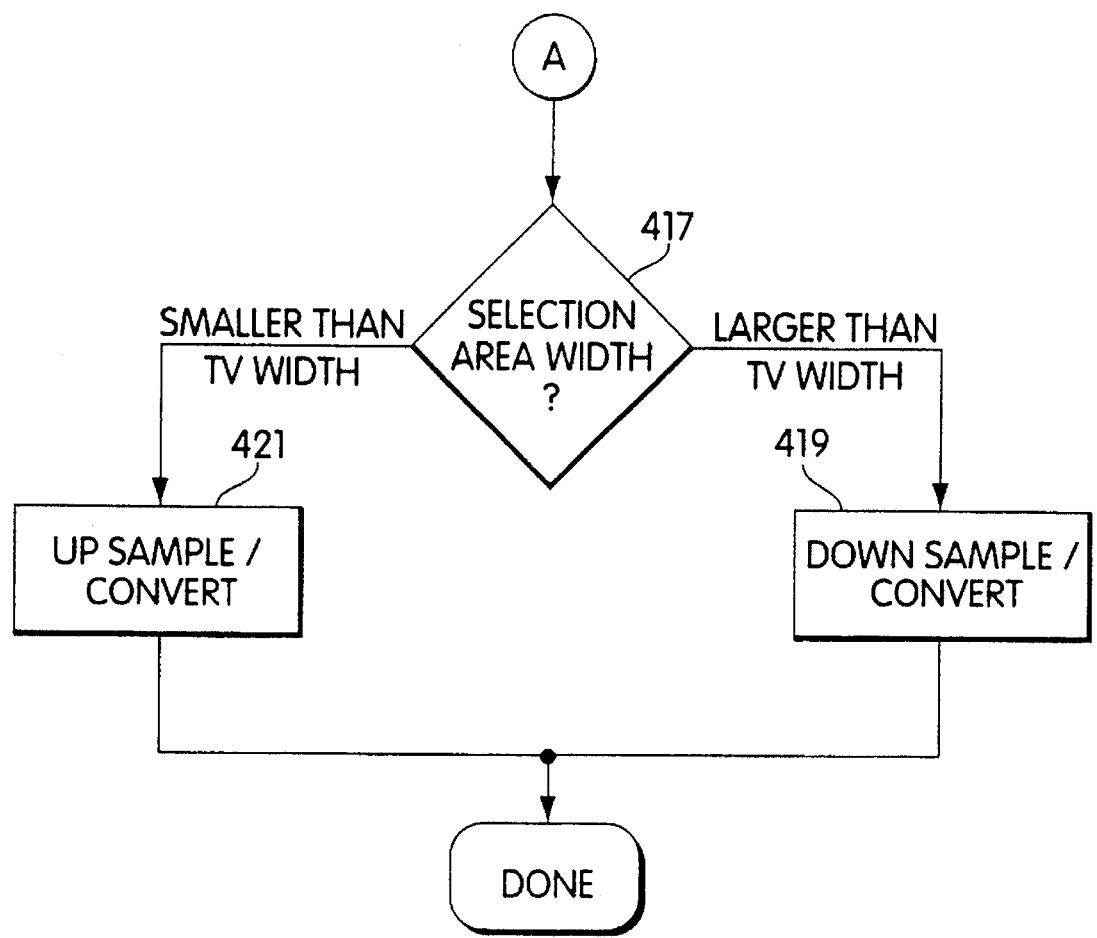

The selection rectangle may be of an arbitrary aspect ratio. However, television images have one of a limited number of standard, defined aspect ratios. Therefore, it is likely that an aspect ratio adjustment should be performed to provide a clear television image corresponding to the contents of the selection rectangle. Aspect ratio adjustment and conversion of the computer display image signal 310 into a television image signal 315 is performed as shown in the flow chart of FIG. 4. For simplicity, the following discussion assumes that pixels have a square shape, and hence an aspect ratio of 1:1, themselves. Naturally the concepts expressed here may be extended by those skilled in the art to display systems having other pixel shapes and aspect ratios.

The aspect ratio of the selection rectangle is first computed (step 401). Then the aspect ratio of a target format standard television image is computed (step 403). Of course, the standard television image aspect ratio may alternatively be precomputed and stored or computed at a different point in time, but prior to the ratio being required. A comparison (step 405)is performed between the aspect ratio of the selection rectangle and the standard television image aspect ratio. If the result of the comparison (step 405) is that the aspect ratios are within a predetermined tolerance of each other, for example 2%, then the rectangle selected is automatically adjusted (step 407) by an arbitrary algorithm to have exactly the standard television image aspect ratio. The selection rectangle may be either enlarged in one dimension or shrunk in the other dimension to accomplish the automatic adjustment, as desired.

If the comparison (step 405) indicates that the aspect ratios are not within a predetermined tolerance of each other, for example 2%, then further adjustment is desirable. If the comparison (step 405) indicates that the aspect ratio of the selection rectangle is wider than the standard television image aspect ratio, then the selection rectangle is vertically centered (step 409*a*), for example by padding the image signal corresponding to areas above and below the rectangle until the resulting rectangle has the standard television image aspect ratio. The padding may be any suitable filler image signal such as, for example, a signal representing black pixels. If the absolute width, in pixels, of the resulting rectangle is in a predetermined range of the width of a standard television image (step 411*a*), for example 90%–101%, then the width of the resulting rectangle is automatically adjusted (step 413*a*) to equal the width of the standard television image.

Under similar conditions with respect to image height, similar steps (steps 409*b*, 411*b* and 413*b*) are performed. Thus, a resulting rectangle having a height adjusted to match a standard television image is produced.

The image signal representing the resulting rectangle is finally converted (step 415 and FIG. 3, 317), for example using a fast integer-ratio bitmap conversion, discussed below. Since absolute sizes of input and output images have been made equal, as measured in pixels, no resolution adjustment is necessary.

If the absolute width or height is out of the bounds noted (steps 411*a* and 411*b*), then a determination is made (step 417) whether the absolute size of the resulting rectangle is greater than or less than the absolute size of a standard television image. If the size of the resulting rectangle is greater than that of a standard television image, then the image signal representing the resulting rectangle is downsampled (step 419) during conversion (FIG. 3, 317) thereby adjusting the input resolution to match the output resolution; while if the size of the resulting rectangle is less than that of a standard television image, then the image signal representing the resulting rectangle is upsampled (step 421) during conversion (FIG. 3, 317), also thereby adjusting the input resolution to match the output resolution. The conversion processes (steps 419 and 421 and FIG. 3, 317) are discussed below.

Up to this point, the selection and conversion process has been described substantially as though it were static over time. However, although the selection rectangle is typically selected once for an extended time, the computer display image may be changing or moving during that time. For example, the operator may be moving the cursor to point to several different items within the computer display image, or the underlying computer display image may be updated during the course of a calculation performed by the application program. Therefore, it is desirable to give remote viewers a corresponding illusion of motion. Two timing loops execute to provide that illusion of motion by periodically updating the television image signal transmitted to the remote site. One loop periodically obtains a snapshot (FIG. 3, 311) of the selection rectangle for conversion, as described below. The second loop which performs cursor insertion (FIG. 3, 313) is illustrated in the flow chart of FIG. 7.

Figure 7:
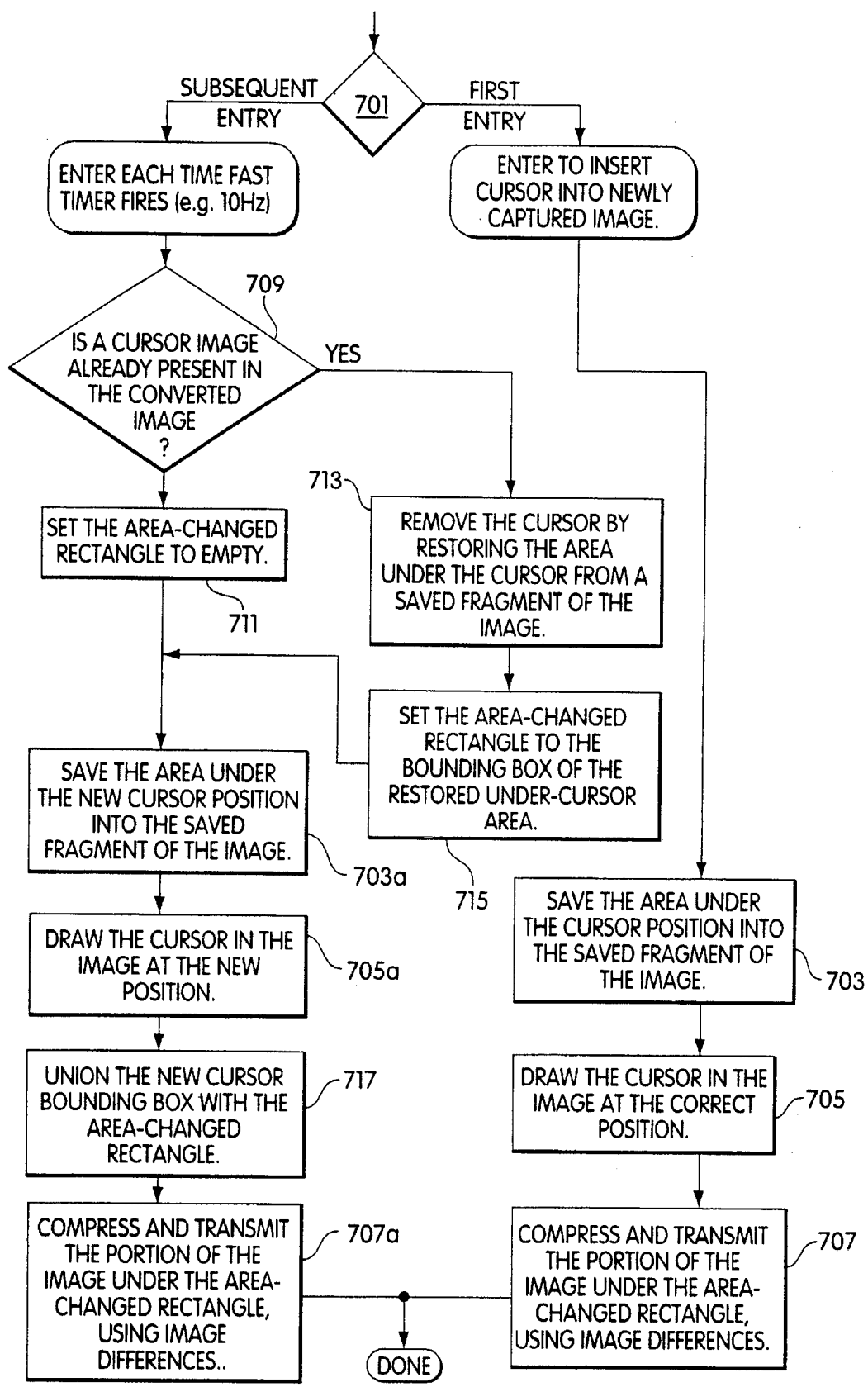
FIG. 7 is a flow chart showing a method of cursor insertion according to one aspect of the present invention.

Since viewers are generally more sensitive to small cursor motions than to changes in the overall image, the cursor update of the second timing loop shown in FIG. 7 operates at a 100 mSec interval, while the image capture and conversion is triggered by the first timing loop having a 600 mSec interval. Of course, these times may be altered to suit particular applications.

Upon repeated execution of the first timing loop, a sequence of VGA image signals is converted into a digital television signal. Resolution may be adjusted by upsampling or downsampling as discussed briefly above. The process involves both resolution conversion and color conversion. The resolution and color are both performed by one process, because the output television signal includes both an output chroma signal representative of the color content of the image and an output luma signal representative of the brightness of the image, wherein the resolution of the output chroma signal and the resolution of the output luma signal differ from each other. For example, one digital television signal format desired to be output includes four luma signal samples corresponding to each chroma signal sample; whereas the input VGA signal includes a red, a green and a blue signal, each having the same resolution.

Figure 5:
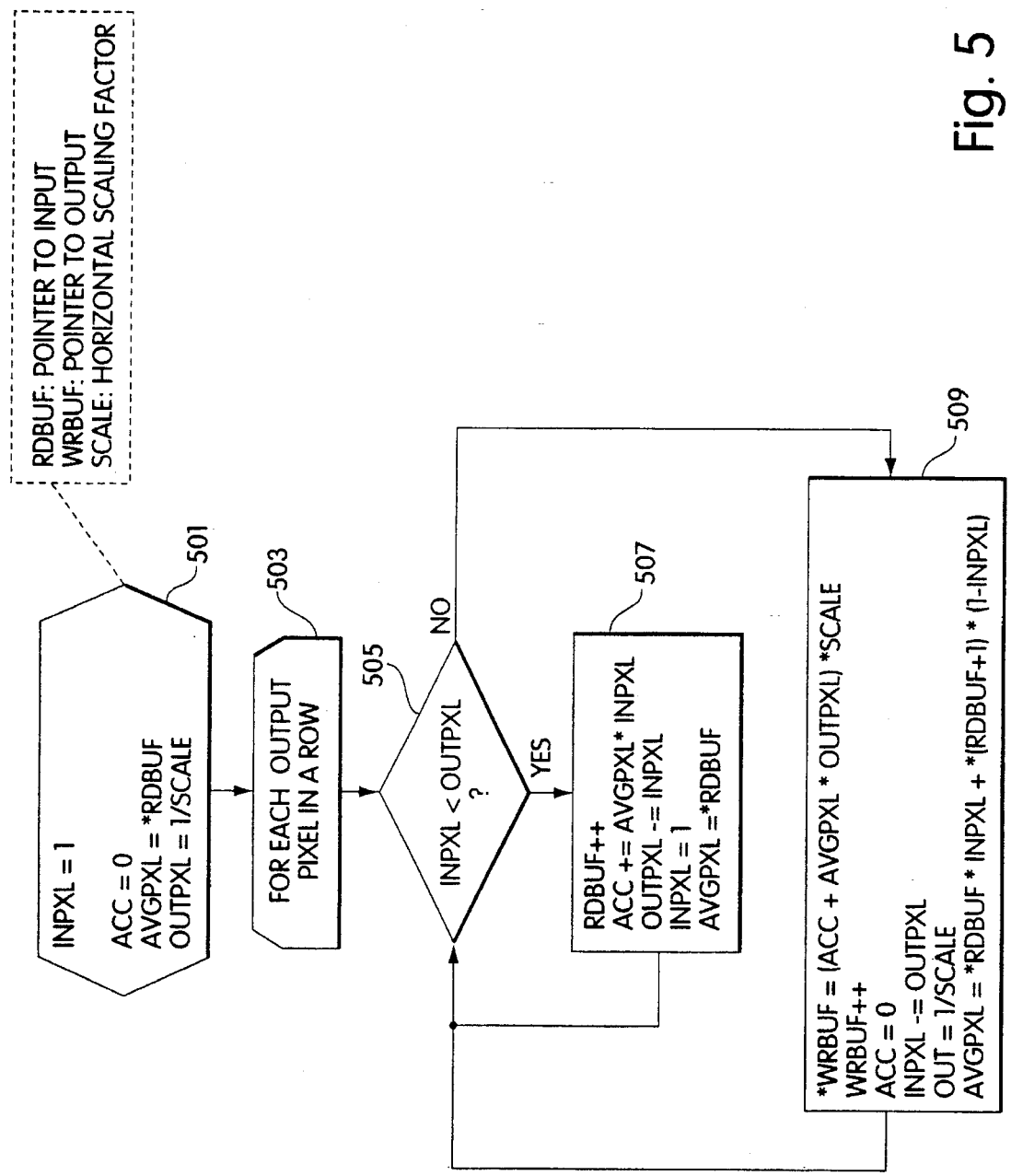
FIG. 5 is a flow chart showing a method of conversion including upsampling of the input.
Figure 6:
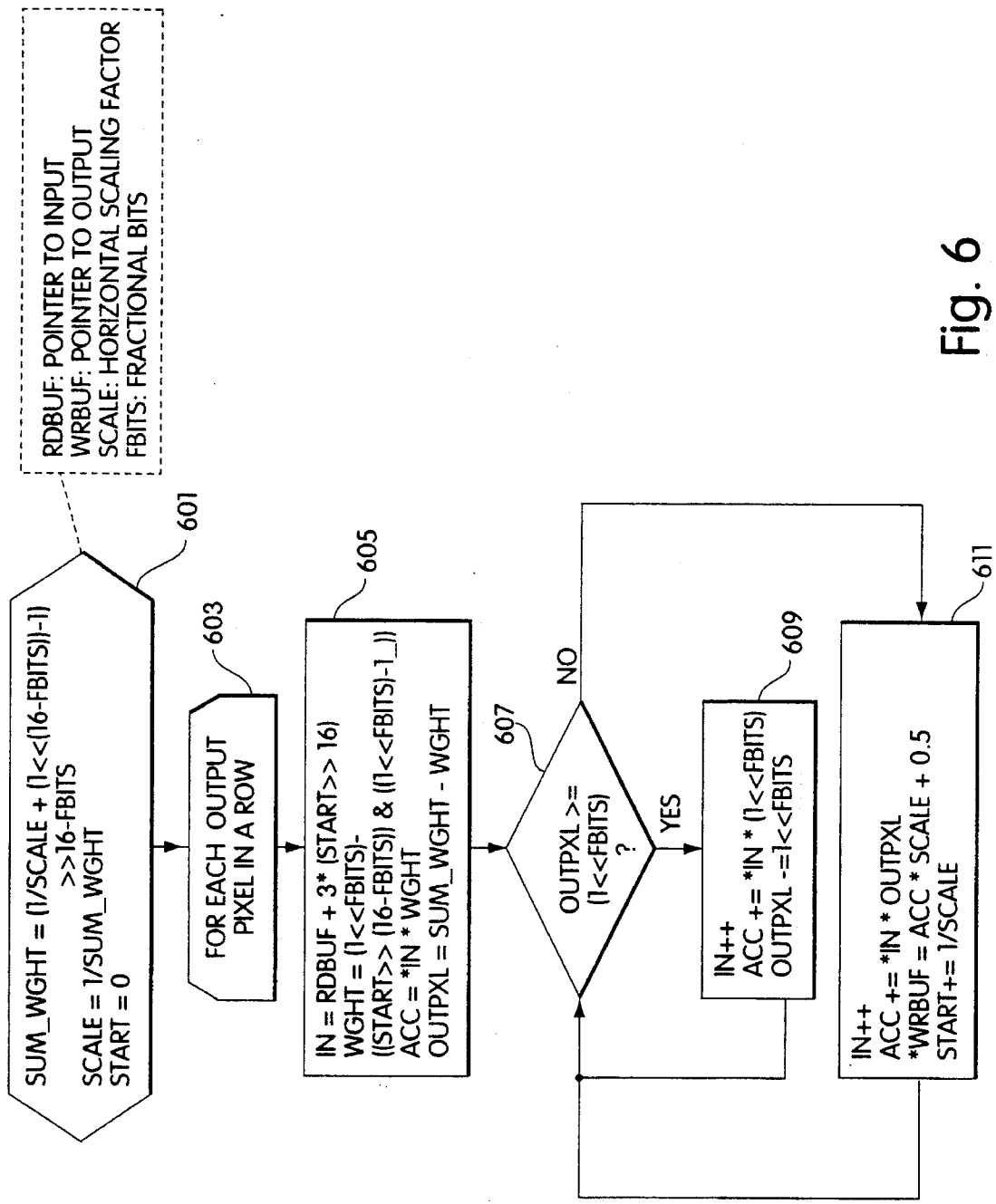
FIG. 6 is a flow chart showing a method of conversion including downsampling the input.

The input VGA signal typically has a higher resolution than the output television signal, but a much smaller number of discrete colors. For example, the input VGA signal may represent a palette of a discrete number of colors, typically 16, 256, 32,768 or 65,536 colors, while the output television signal may represent a palette of about 16 million colors. It is desired that the perceived resolution of the VGA image be preserved in the output television signal to the greatest extent possible. This is accomplished in the illustrated embodiment of the present invention by performing antialiasing by subsampling. A multi-tap filter carries out the desired antialiasing during the resolution conversion process. The multi-tap filter is implemented as a software program whose steps are illustrated in FIGS. 5 and 6. Optionally, a multi-tap antialiasing filter is applied to the luma signal while a simple decimation filter, such as that shown in FIG. 8, is applied to the chroma signal.

Figure 8:
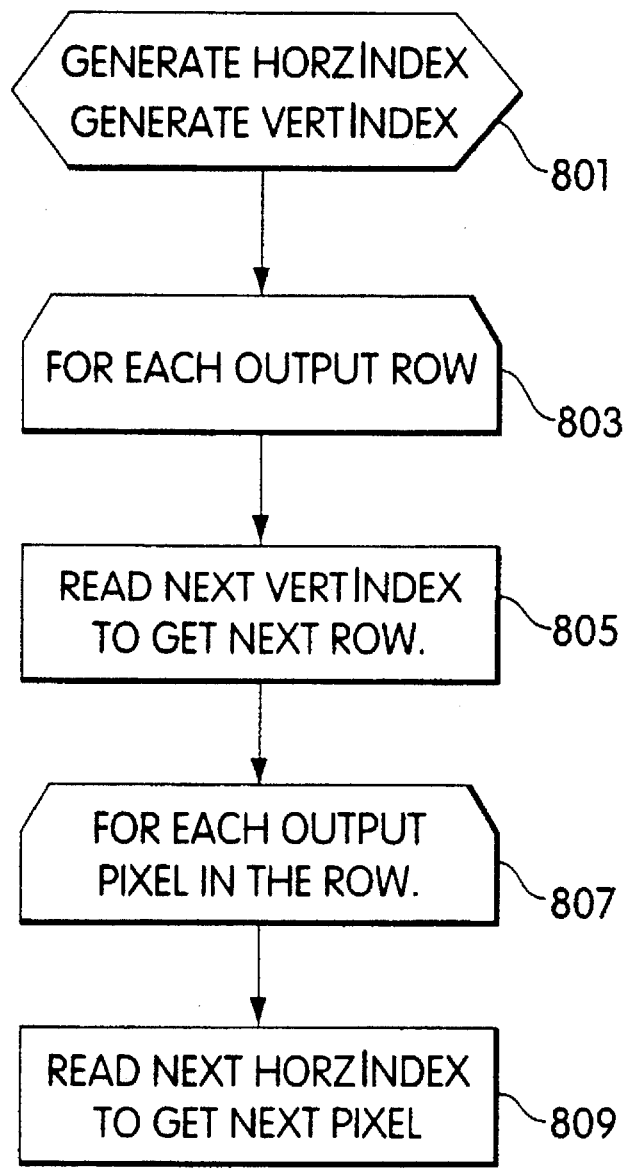
FIG. 8 is a flow chart showing a method of decimation filtering for chroma.

The simple decimation filter of FIG. 8 is now briefly described. In step 801 a horizontal index, horzIndex, and a vertical index, vertIndex, which contain integers indicative of those pixels to be retained in the decimated signal. That is, if the signal is to be decimated by a ratio of 1/N, then horzIndex and vertIndex contain integers indicative of every Nth pixel in every Nth row. Of course, this may be generalized by rounding N to an integer, if the ratio is not a rational number of the form 1/N, and by having different ratios for horizontal and vertical decimation. Next, a pair of nested loops (steps 803 and 807) are performed to process all pixels in the image signal. The inner loop (step 807) causes each pixel in a row which is pointed to by horzIndex to be output (step 809). The outer loop (step 803) causes each row pointed to by vertIndex to be read (step 805) for processing by the inner loop (step 807).

In accordance with one aspect of the illustrated embodiment, the resolution conversion process takes advantage of the limited number of colors generally found in useful VGA image signals. Rather than selecting an exact color match among the approximately 16 million output possibilities for each input color, the conversion process picks a closest one of a limited number of predetermined color combinations. The predetermined color combinations are selected in such a manner that reasonable color accuracy is maintained along with good contrast in the output television signal.

Even using the best available antialiasing by subsampling techniques, some detail from the input VGA signal will be lost, because the input VGA signal generally has a higher resolution than the output television signal. Therefore, in order to permit the PC operator to preview the output signal and adjust the selection area for the best resolution conversion and overall picture quality, the conversion process produces an output signal which is transmitted to the VGA device driver for local display on the computer display monitor. The output signal is a VGA signal having resolution and color characteristics representative of the output television signal which is to be further processed.

The conversion processes (FIG. 3, 317) for upsampling and downsampling are now described in connection with FIGS. 5 and 6, respectively.

Upsampling is performed as shown in FIG. 5 by a known, generic resampling process. First, the variables of the process are initialized (step 501). The process is performed on a row-by-row basis. Thus, the subsequent steps of the process are performed for each output pixel in a row (step 503). The upsampling is then performed by producing multiple output pixels for each input pixel, while performing antialiasing filtering (steps 505, 507 and 509). Downsampling is illustrated in connection with FIG. 6. Process variables are first initialized (step 601). Then, processing proceeds on a row-by-row basis, wherein the process steps are performed for each output pixel in a row (step 603). The weighting factors by which input pixels are multiplied, wght and sum_wght, are quantized to a small subset of possible values. Thus, multiplications called for (steps 605, 609 and 611) may be performed by use of lookup tables. The downsampling is performed (steps 605, 607, 609 and 611) relatively quickly due to the use of lookup tables instead of multiply operations. The lookup tables simply contain output values corresponding to each possible input value multiplied by the proper weight. Multiplication is thus accomplished by simply reading a value at an address in the table corresponding to the input value. Image signals downsampled using the process of FIG. 6 result in comparable or better visual quality than known processes.

After a computer display image signal is captured and converted, it is divided into regions 176 pixels wide by 48 pixels high. Each of these regions is known as a group of blocks. In the illustrated embodiment of the invention, a 32-bit cyclical redundancy check (CRC) polynomial is computed for the group of blocks. CRCs for corresponding groups of blocks in a succession of snapshots may be compared to identify when the image within a group of blocks has changed since a previous snapshot. Similarly, within each group of blocks for which a change is detected, CRCs may be computed for macroblocks of 16 pixels by 16 pixels, so as to identify which macroblock has changed. By predetermining which portions of a digital image signal represent regions of the computer display image which have changed, the subsequent compression steps of the process are rendered more efficient, as next described. More of the compressed image signals may be allocated to those portions of the digital image signal which represent changed regions than to those portions of a digital image signal which are static.

The last step before conventionally compressing (FIG. 3, 319) the computer display image signal is insertion (FIG. 3, 313) of the cursor icon. The cursor icon is inserted on a repetitive basis, in accordance with the timing of the second timing loop, as illustrated in FIG. 7 and described next. The following discussion is based on the described software obtaining the cursor position from the operating system or other suitable source of such information, when required.

The first time a computer display image signal is captured (step 701), the image area under the desired cursor position is first saved as an image fragment (step 703). The cursor icon is then inserted in the image signal at the location from which the image fragment was saved (step 705). Finally, the macroblock and group of blocks of the image signal containing the cursor is marked as changed, as described above. Therefore, that portion of the image signal including the cursor is compressed and transmitted using image differences, as is conventionally done (step 707).

Subsequent to the first capture of a digital image signal, each time the cursor timing loop executes, similar acts (steps 703a, 705a and 707a) are performed with respect to the most current cursor position. Additional acts (steps 709, 711, 713, 715 and 717) remove a previous cursor icon, if any, from the digital image signal and mark the macroblocks and groups of blocks containing the previous cursor icon changed as well. Thus, when step 707a compresses and transmits the digital image signal, both the disappearance of any old cursor icon and appearance of any new cursor icon is simultaneously achieved.

Figure 1:
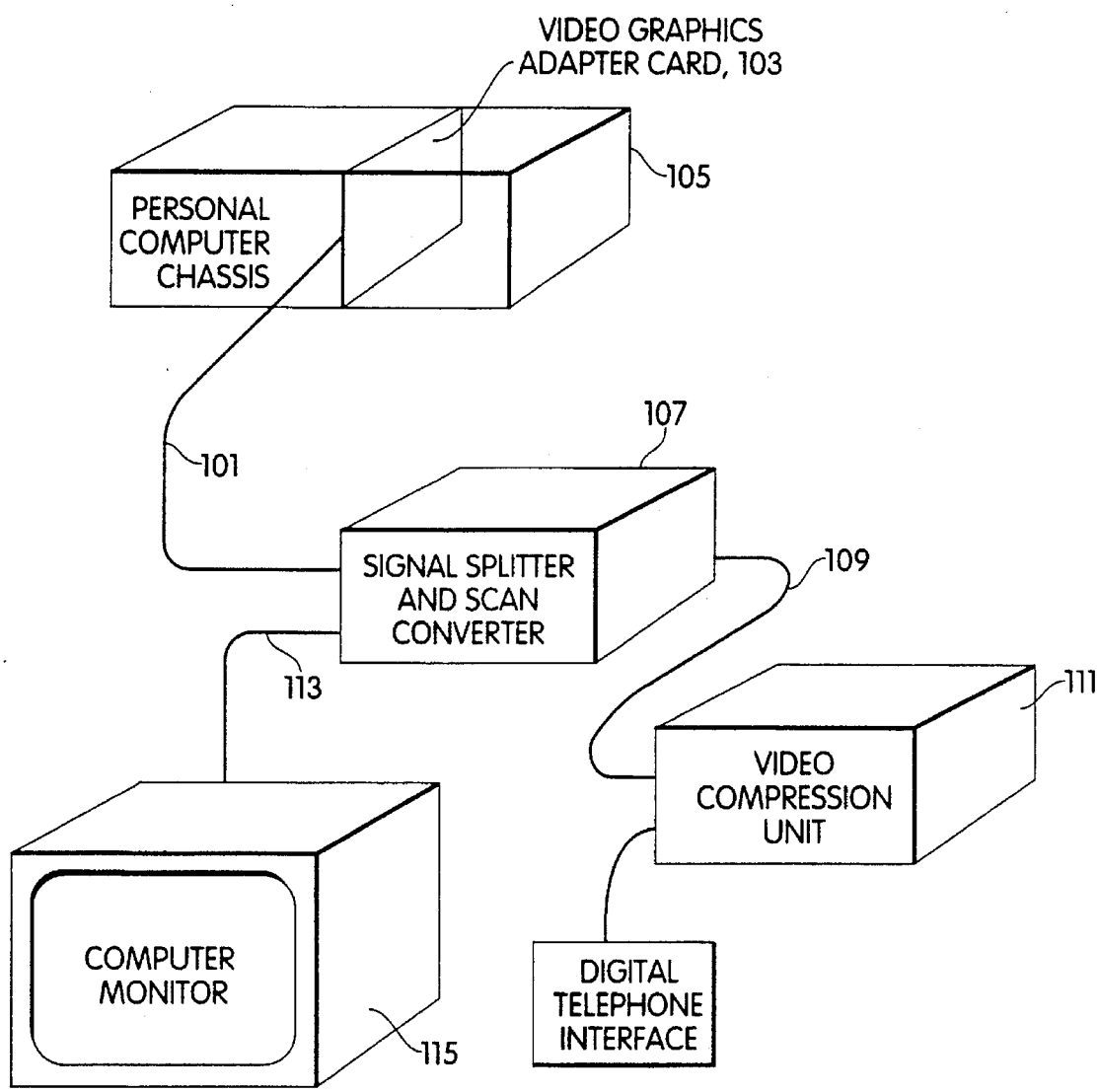
FIG. 1 is a block diagram of a conventional teleconferencing system permitting transmission of computer displays.

Since the output of the conversion process (FIG. 3, 317) is a digital television signal (FIG. 3, 315), in proper format for compression and transmission (FIG. 3, 319), it may readily be digitally mixed and switched with other television-type digital video signals (FIG. 3, 321) prior to compression (FIG. 3, 319). By permitting the PC operator to digitally select which source to use as the input to the compression module, clean switching between sources is accomplished. Different sources of analog video signals need not be synchronized in time with each other, because when the digital signals are processed in a computer memory the output may be selected to begin at the appropriate point in time. Furthermore, since all signal processing steps have been done digitally in a computer, noise has not been added to the output television signal, thus obviating the need for temporal filtering, such as is required in prior art system shown in FIG. 1. The compressed output signal is suitable for transmission over the digital telephone network. It may include images from the computer display or another source and may switch between sources, as described.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. A system for video conferencing, comprising:
 a computer including a graphics subsystem in which a computer display image is represented by a digital computer display signal having a first format different from a digital television signal having a second format, the graphics subsystem receiving as an input the digital computer display signal;
 means in the computer connected to the graphics subsystem, for obtaining from the graphics subsystem a portion of the digital computer display signal, the portion forming a sequence of frames representative of at least a portion of the computer display image;

means in the computer connected to receive the sequence of frames from the means for obtaining, for converting the sequence of frames of the digital computer display signal of the first format into a sequence of frames forming a digital television signal of the second format; and means in the computer connected to receive the digital television signal, for compressing the digital television signal for transmission to a system for receiving compressed digital television signals.

2. A system for video conferencing, comprising:

a computer including a graphics subsystem in which a computer display image is represented by a digital computer display signal having a format different from a digital television signal format, the graphics subsystem receiving as an input the digital computer display signal;

means in the computer connected to the graphics subsystem, for obtaining from the graphics subsystem a portion of the digital computer display signal, the portion forming a sequence of frames representative of at least a portion of the computer display image;

means in the computer connected to receive the sequence of frames from the means for obtaining, for converting the sequence of frames of the digital computer display signal into a sequence of frames forming a digital television signal;

means in the computer connected to receive the digital television signal, for compressing the digital television signal for transmission to a system for receiving compressed digital television signals;

a television camera having a television signal output; and a video capture subsystem in the computer, connected to receive the television signal output from the television camera so as to produce another digital television signal input to the means for compressing.

3. A system for video conferencing, comprising:

a computer including a graphics subsystem in which a computer display image is represented by a digital computer display signal having a format different from a digital television signal format;

means for obtaining from the graphics subsystem a sequence of frames of the digital computer display signal, the frames representative of at least a portion of the computer display image;

means for converting the sequence of frames of the digital computer display signal into a sequence of frames of a digital television signal;

means for compressing the digital television signal for transmission to a system for receiving compressed digital television signals;

a television camera having a television signal output;

a video capture subsystem in the computer, connected to receive the television signal output from the television camera so as to produce another digital television signal input to the means for compressing; and wherein the means for compressing further comprises means for switching between compressing the digital television signal and compressing the another digital television signal.

4. A system for video conferencing, comprising:

a computer including a graphics subsystem in which a computer display image is represented by a digital computer display signal having a format different from a digital television signal format, the graphics subsystem receiving as an input the digital computer display signal;

means in the computer connected to the graphics subsystem, for obtaining from the graphics subsystem a portion of the digital computer display signal, the portion forming a sequence of frames representative of at least a portion of the computer display image;

means in the computer connected to receive the sequence of frames from the means for obtaining, for converting the sequence of frames of the digital computer display signal into a sequence of frames forming a digital television signal;

means in the computer connected to receive the digital television signal, for compressing the digital television signal for transmission to a system for receiving compressed digital television signals;

wherein the means for converting further comprises:

a cursor insertion subsystem, connected to receive the television signal output from the means for converting so as to produce the digital television signal.

5. A system for video conferencing, comprising:

a computer including a graphics subsystem in which a computer display image is represented by a digital computer display signal having a format different from a digital television signal format, the graphics subsystem receiving as an input the digital computer display signal;

means in the computer connected to the graphics subsystem, for obtaining from the graphics subsystem a portion of the digital computer display signal, the portion forming a sequence of frames representative of at least a portion of the computer display image;

means in the computer connected to receive the sequence of frames from the means for obtaining, for converting the sequence of frames of the digital computer display signal into a sequence of frames forming a digital television signal;

means in the computer connected to receive the digital television signal, for compressing the digital television signal for transmission to a system for receiving compressed digital television signals:

wherein the means for obtaining further comprises:

means for selecting physical boundaries of a portion of the computer display image represented by the sequence of frames.

6. A system for video conferencing, comprising:

a computer system including a source of digital computer display image signals and a source of cursor location information;

a snapshot module operative within the computer system with an input for receiving the digital computer display image signals, and which produces as an output selected digital computer display image signals;

a conversion module operative within the computer system with an input for receiving the selected digital computer display image signals, and which produces as an output conventional digital television image signals corresponding to the received selected digital computer display image signals; and a cursor insertion module which inserts a cursor icon at a location in the conventional digital television image signals indicated by the cursor location information.

7. The system of claim 6, further comprising:

a timing loop which periodically triggers operation of the snapshot module.

8. The system of claim 6, wherein the conversion module further comprises:

a decimation/interpolation filter.

9. The system of claim 6, wherein the conversion module further comprises:

a multiplier which applies at least one weighting factor to at least one input pixel by performing a table lookup based on the input pixel signal value.

10. A system for video conferencing, comprising:

means for compressing digital television signals having a first format, having a first input and a second input;

a first source of digital television signals, including a television camera, the first source of digital television signals connected to the first input of the means for compressing digital television signals; and a second source of digital television signals, including a computer display signal generator and a means for converting a generated computer display signal having a second format into a digital television signal having the first format, the second source of digital television signals connected to the second input of the means for compressing digital television signals.

11. A method of video conferencing between a local location and a remote location using a computer, comprising the steps of:

obtaining in the computer a digital computer display image signal;

selecting for transmission a portion of the digital computer display image signal representative of a portion of a display image;

scaling the selected portion of the digital computer display image signal, forming a scaled image signal;

converting the scaled image signal into a digital television signal;

inserting a cursor icon at a selected location within the digital television signal; and compressing and transmitting the digital television signal to the remote location.

12. The method of claim 11, wherein the step of scaling further comprises the step of:

filtering using a decimation/interpolation filter.

* * * * *